(12) United States Patent
Meisner et al.

(10) Patent No.: US 6,313,824 B1
(45) Date of Patent: Nov. 6, 2001

(54) IMAGE PREVIEW SYSTEM

(75) Inventors: Douglas E. Meisner, Arden Hills, MN (US); Douglas C. Shimonek, Sioux City, IA (US); Douglas K. Olson, Shoreview, MN (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/058,879

(22) Filed: Apr. 10, 1998

(51) Int. Cl.[7] ..................................... G06F 17/00
(52) U.S. Cl. ............................. 345/150; 345/199
(58) Field of Search ..................... 345/153, 431, 345/115, 418, 329, 328, 3, 334, 346, 147, 154, 155, 199, 150; 348/396; 358/500; 395/346; 441/92

(56) References Cited

U.S. PATENT DOCUMENTS

| | | | |
|---|---|---|---|
| 5,257,097 | * 10/1993 | Pineau et al. | 358/500 |
| 5,384,902 | * 1/1995 | Carlsen | 345/431 |
| 5,455,600 | * 10/1995 | Friedman et al. | 345/153 |
| 5,519,439 | * 5/1996 | Keith | 348/396 |
| 5,640,522 | * 6/1997 | Warrin | 395/346 |
| 5,664,080 | * 9/1997 | Lucas et al. | 441/92 |
| 5,675,717 | * 10/1997 | Yamamoto | 395/109 |
| 5,729,704 | * 3/1998 | Stone et al. | 395/346 |
| 5,748,342 | * 5/1998 | Usami | 358/500 |
| 5,880,856 | * 3/1999 | Ferriere | 358/432 |
| 6,011,537 | * 1/2000 | Slotznick | 345/115 |
| 6,058,207 | * 5/2000 | Tuijn et al. | 382/162 |
| 6,091,408 | * 7/2000 | Treibitz et al. | 345/329 |

OTHER PUBLICATIONS

Macromedia, Inc., Macromedia Introduces FireWorks ™, Mar. 10, 1998, pages printed from Macromedia WWW site.
Schmitt, B., Fireworks: Works as Advertised, May 22, 1998, pages printed from Design Shops WWW site.
Schmitt, B., Optimization: Quality vs. Speed, May 22, 1998, pages printed from Design Shops WWW site.
Nicholls, D., A Guide to Web Image Compression Software: PhotoGIF Filter, Apr. 1998, pages printed from http://www.home.aone.net.au/byzantium/graphics/graphics.html.
King, A.B., Tools, Tips and Techniques: Optimizing Web Graphics, Jun. 10, 1996, pages printed from The Webmaster's Reference Library WWW site.
Kaiser, J., Color the Web, Mar. 26, 1998, pages printed from About.com WWW site.
Barzeski, E.J., Furbo Filters, Feb. 1998, pages printed from Apple Wizards WWW site.
Hockenberry, C. et al., Webmaster Series, 1998, pages printed from Furbo Filters WWW site.
McClelland, D., Best Photoshop Plug–ins, Feb. 1998, pages printed from MacWorld WWW site.

* cited by examiner

*Primary Examiner*—Steven Saras
*Assistant Examiner*—Fritz Alphonse
(74) *Attorney, Agent, or Firm*—Fish & Richardson P.C.

(57) ABSTRACT

A method of previewing an image displayed in a first video graphics environment as it will appear in a second differently palettized video graphics environment. The method includes determining the appearance of the image as it will appear in the second video graphics environment, and concurrent with displaying the image in the first video graphics environment, displaying the appearance of the image as it will appear in the second video graphics environment. The invention also features a method of tailoring how an image displayed in a first video graphics environment appears in a second video graphics environment. Tailoring can include providing a preview of an image as it will appear in the second video graphics environment, receiving user selection input that selects a video display characteristic of the preview image, determining a replacement video display characteristic provided by the second video graphics environment, and replacing the selected video display characteristic of the preview image with the determined replacement display characteristic.

16 Claims, 7 Drawing Sheets

IMAGE PREVIEW SYSTEM

BACKGROUND

Different computers can use different video graphics environments to display images on monitor screens. For example, different environments can use a different number of bits to represent pixels. Differences in graphic environments can cause images developed in a first graphic environment to be altered when displayed in a second. For example, pixels in Internet images are often represented by eight-bit tuples offering millions of pixel colors, but are often displayed in a second environment offering a palette of only 256 pixel colors (e.g., a single 8-bit byte is used to represent pixel color). The second environment may dither the image to simulate colors provided by the first environment. One type of dithering intermixes differently colored pixels to produce an appearance of a color not found in a palette (e.g., intermixing red and blue pixels can produce the appearance of purple). While dithering can be effective, the technique often produces noisy, grainy images.

Some image developers solve this problem by limiting themselves to a small subset of the pixel colors (i.e., "Web-safe" palette colors) their environment provides. Others try to produce images that take advantage of the capabilities of more sophisticated environments while lessening the impact (e.g., dithering) of display in less sophisticated environments. Commonly, these developers produce an image in a first graphics environment, alter system parameters to replicate a different graphics environment (e.g., reduce the number of bits the system display uses to describe each pixel), reboot the computer, and view the image. To fix problems discovered by viewing the image in the second graphics environment, the developer can reset system parameters and reboot again.

Developers have also used Adobe Photoshop™ to view an image as it will appear in a different environment. Developers using Photoshop™ can save an image developed in a first graphics environment, maneuver through a series of menus to choose display options that replicate a second graphics environment, then open the saved image in the second environment. After noting image regions that appear unsatisfactorily, the developer can renavigate through menu selections to restore the original graphics environment and modify the original image. The developer can repeat this process until the image appears satisfactorily in both graphics environments.

SUMMARY

In general, in one aspect, the invention provides a preview of an image displayed in a first video graphics environment as it will appear in a second differently palettized video graphics environment by determining the appearance of the image as it will appear in the second video graphics environment, and concurrent with displaying the image in the first video graphics environment, displaying the appearance of the image as it will appear in the second video graphics environment.

Embodiments may include one or more of the following features. The second video graphics environment may be a video graphics environment that uses an 8-bit color palette. The first video graphics environment may be either a 24-bit video graphics environment or an adaptive-palette video graphics environment.

In general, in another aspect, the invention enables developers to tailor how an image displayed in a first video graphics environment will appear in a second video graphics environment. Tailoring proceeds by providing a preview of an image as it will appear in the second video graphics environment. After receiving user selection input that selects a video display characteristic of the preview image and determining a replacement video display characteristic provided by the second video graphics environment, the selected video display characteristic of the preview image is replaced with the determined replacement display characteristic.

Embodiments may include one or more of the following features. The display characteristic may be pixel color. The replacement characteristic may be a web-safe palette color. The user may select the display characteristic by clicking on a region in the preview image. The system may determine a replacement display characteristic by determining the closest web-safe palette color or receiving user input identifying a replacement selection.

Preferably, the different aspects of the invention are embodied in a computer program product disposed on a computer readable medium.

Among the advantages of the invention are one or more of the following. The image preview system enables developers to quickly identify and remedy problems, such as dithering, caused by displaying images in different environments. Further, the system eases control of image appearance in a variety of environments.

Other features and advantages of the invention will become apparent from the following description and from the claims.

DETAILED DESCRIPTION

Figure 1:
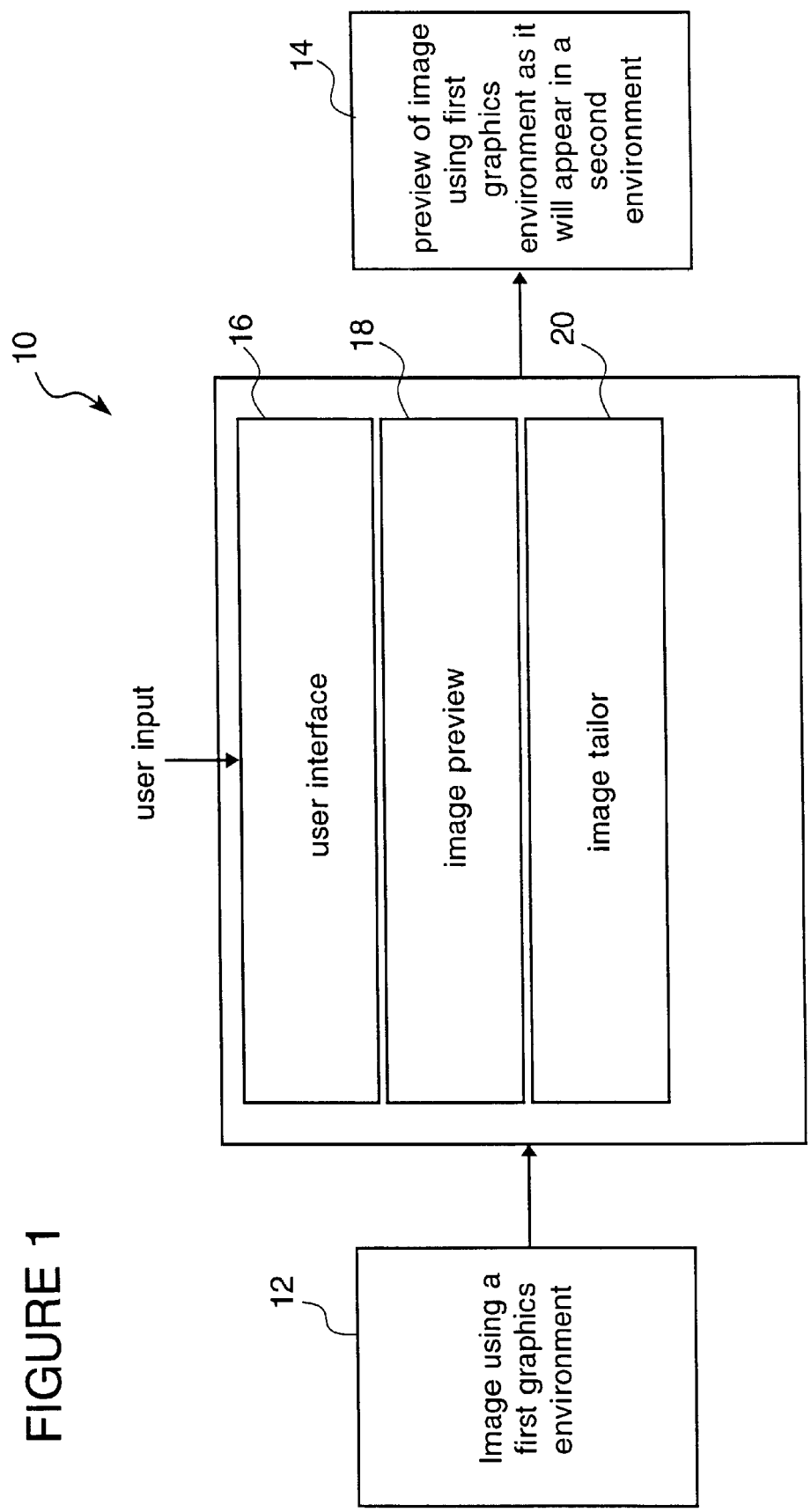
FIG. 1 is a diagram of an image preview system.

Referring to FIG. 1, an image preview system 10 provides developers with a preview image 14 showing how an image 12 displayed in a first video graphics environment will appear in a second video graphics environment. The image preview system 10 includes a user interface 16, an image preview module 18, and an image tailoring module 20. Module 18 permits an image developer to preview how an image 14 will appear in a different second video graphic environment. Module 20 enables a developer to tailor the preview image 14 for display in the second environment.

Figure 2A:
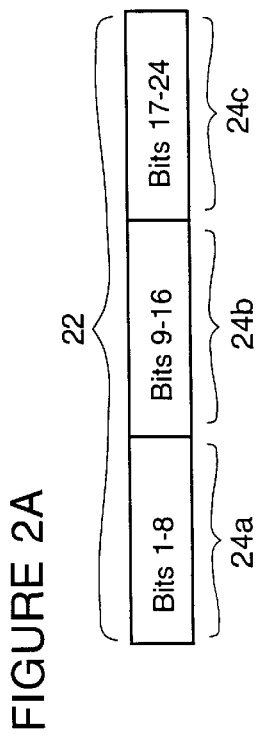
FIGS. 2A–2C are diagrams illustrating how different graphics environments color pixels.
Figure 2B:
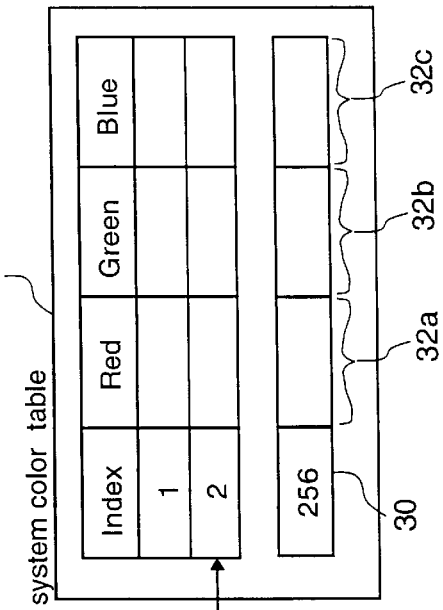
Figure 2C:
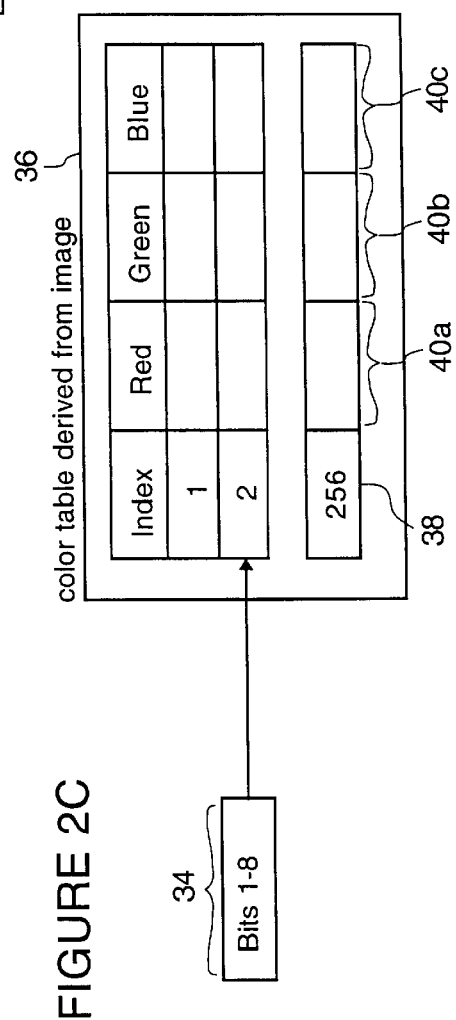

Referring to FIGS. 2A–2C, an image is a collection of pixels (picture elements). A pixel is colored by constituent red, green, and blue intensities. Video graphics environments quantify these intensities into pixel intensity values. FIGS. 2A–2C illustrate a sampling of the different ways graphic environments encode the red, green, and blue intensity values needed to color a pixel.

FIG. 2A shows an environment (e.g., JPEG) where 24-bits 22 (i.e., three eight-bit tuples) describe each pixel in an image. Different bytes 24a–24c represent, respectively, the red, green, and blue intensity values of a pixel. Devoting 8-bits to each intensity value 24a–24c can produce a pixel in any one of nearly 17 million different pixel colors (i.e., the number of unique combinations of 256 intensity values of red, green, and blue). A system that uses 24-bits to color pixels need not use a palette of selected colors.

Other environments use palettes that limit the number of pixel colors available. For example, FIG. 2B shows an environment (e.g., GIF) where an 8-bit index 26 describes each image pixel. A system palette color table 28 (palette) can translate a pixel's 8-bit index 26 into the red 32a, green 32b, and blue 32c intensity values that produce different pixel colors. Since an 8-bit value has a maximum decimal value of 256, the system palette 28 can only provide 256 pixel colors.

Complicating matters, different environments store different colors in their system palettes 28. For example, 8-bit Macintosh® and Windows® system only share 216 out of 256 system palette colors. These shared colors are known as the Web-safe color palette since an image using these colors will appear similarly on both types of systems.

FIG. 2C shows an adaptive-palette color table 36. As in the 8-bit environment described above, each pixel has a corresponding 8-bit index 34 that references a palette color table 36 entry of red 40a, green 40b, and blue 40c intensity values. Unlike 8-bit environments, an adaptive-palette 36 is constructed for each image instead of using the same system palette 28 for all images. The adaptive-palette environment constructs the table 36 by calculating the 256 most frequently occurring pixel colors in an image. Pixel colors that appear in the image but not in the adaptive-palette 36 (e.g., the 257$^{th}$ most frequently occurring pixel color) are converted to the nearest represented palette 36 color. For example, a light blue may be converted to a slightly darker blue that appears more frequently in the image. Since colors in the image are used to construct an adaptive-palette 36, adaptive-palettes 36 often require few palette colors and less dithering to describe an image.

An image developed in one environment is often altered when displayed in a different environment. For example, when an image described by 24-bits is displayed in an 8-bit palettized environment, the 8-bit environment sometimes dithers image regions to simulate pixel colors not provided by 8-bit color palette ("missing colors"). The 8-bit environment commonly use a "median-cut algorithm" that dithers by replacing pixels with values corresponding to a particular missing color with differently colored pixels whose intensity values average out to the missing color. For example, a shade of aqua might have a red intensity of zero, a blue intensity of 200, and a green intensity of 50. Although an 8-bit palette may not provide aqua, intermixing pixels having blue intensities of 225 and green intensities of 25 with pixels having blue intensities of 175 and green intensities of 75, can produce an image region that has the same average pixel intensities as an aqua colored region. Dithering may use more than two pixel colors and may use a variety of patterns (e.g., hatching). Although sometimes effective, dithered regions can appear "speckled," particularly in smooth areas containing a single color. The graphics preview environment of FIG. 1 enables a graphics developer to detect and lessen undesirable dithering without limiting an image to colors found in the Web-safe palette.

Figure 3:
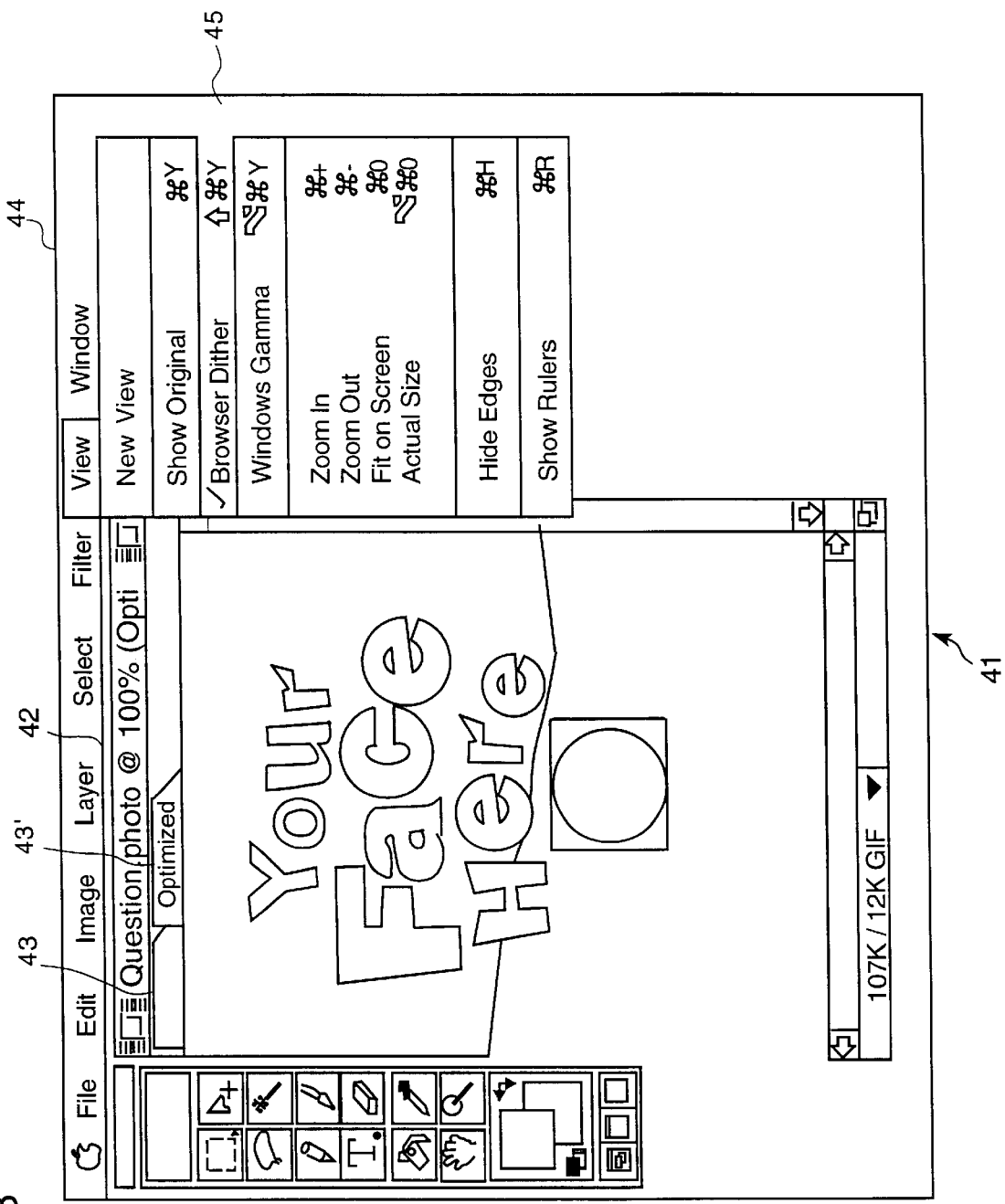
FIG. 3 is diagram of a graphical user interface that provides image previewing.

Referring to FIG. 3, the graphic user interface 41 enables developers to preview how an image developed in a first video graphics environment will appear in a second video graphics environment. The interface 41 can present the preview image to a developer in a variety of ways. As shown, the interface 41 provides a tabbed window 42 control where the "Original" tab corresponds to the image 43 as it appears in the first environment and the "Optimized" tab corresponds to a preview of the image 43' as it will appear in the second environment. Selecting a tab displays the corresponding original 43 or preview image 43'. Many other ways of presenting and controlling preview image display are possible. For example, the interface 41 can simply provide a movable image preview window (not shown). The interface can also display a preview image 43' when a preview option 45 from a menu 44 is selected. Additionally, the image preview system 10 can continually update a preview image 43' after each alteration to the original image 43. The preview image 43' provides developers with quick feedback that can guide development of the original image in a manner that eliminates undesirable display attributes in other environments.

Figure 4:
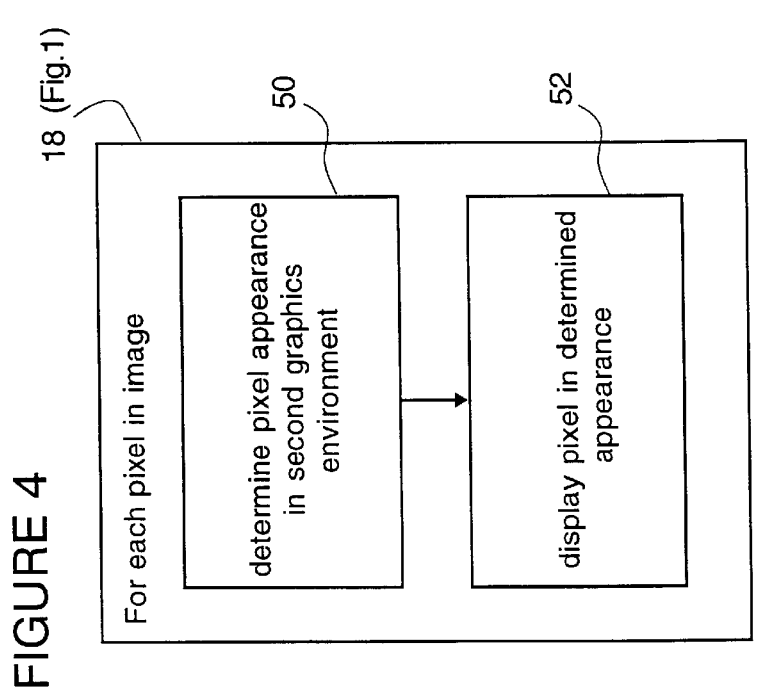

Referring to FIG. 4, to produce a preview image, the image preview system (18) determines the pixel intensity values (50) a second environment would use to color each image pixel. By collecting and arranging these pixel values, the image preview system (18) can produce the preview image (52).

Figure 5:
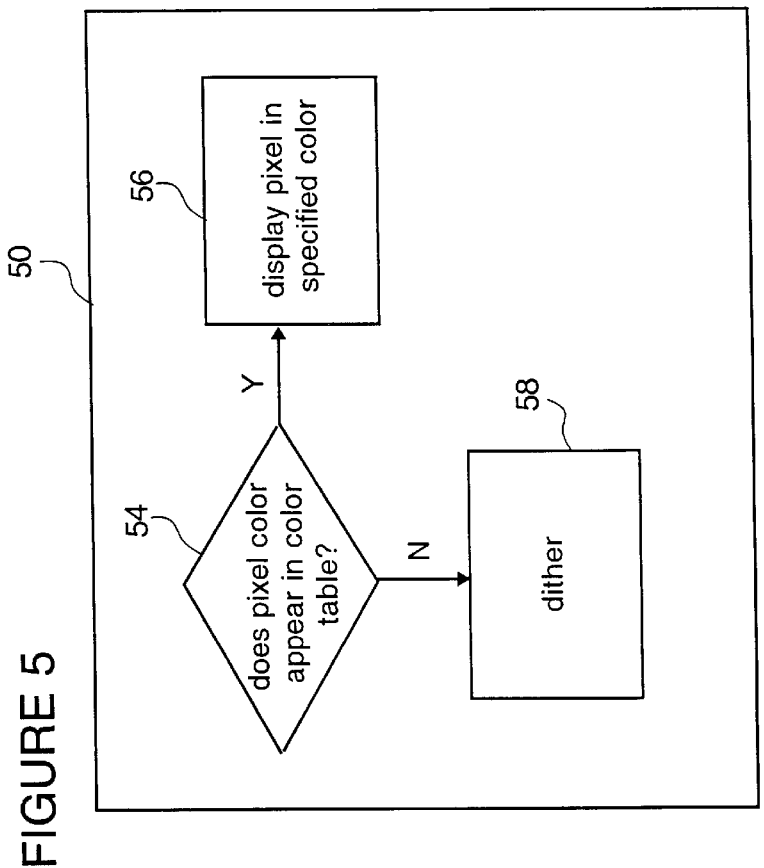
FIGS. 4 and 5 are flowcharts of image previewing.

Referring to FIG. 5, a developer may be interested in seeing dither patterns produced by displaying a 24-bit image in an 8-bit palettized graphics environment. As shown, the image preview module determines values for each pixel by determining (54) whether the 24-bit color value appears in the 8-bit system palette color table. If not, the module determines how the second environment will dither (58) the regions of the image (e.g., producing pixel values that average out to the desired color).

Producing a preview image from an image that uses an adaptive-palette follows the same logical flow described above, however, each pixel index value is dereferenced (i.e., the corresponding red, green, and blue intensity values are extracted from the adaptive-palette color table) before proceeding.

Figure 6:
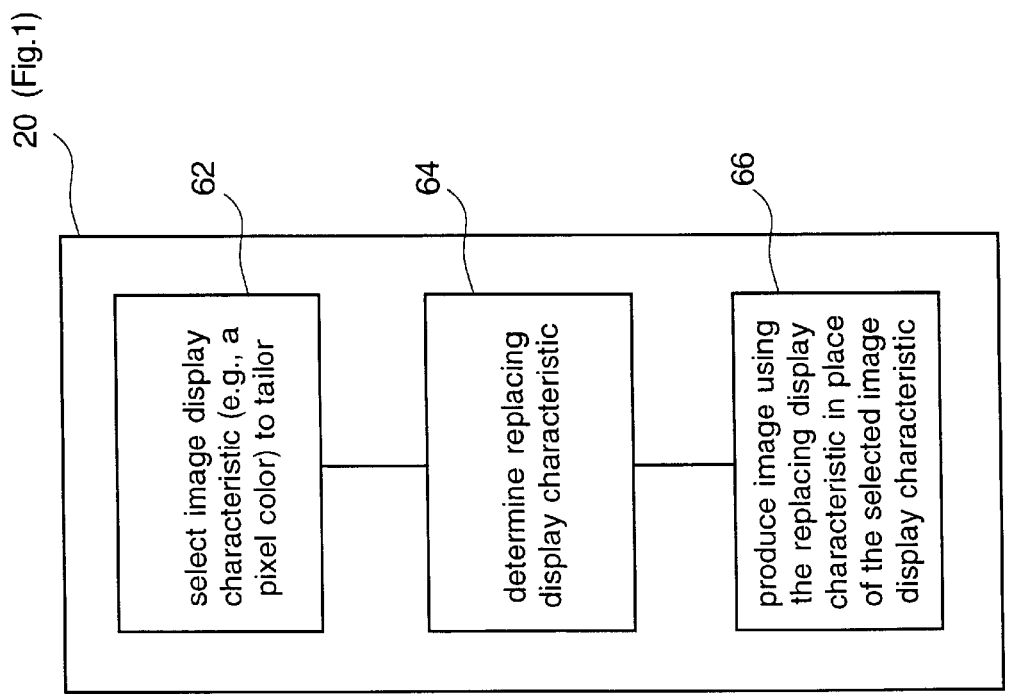
FIG. 6 is a flowchart of image tailoring.

Referring to FIG. 6, the image preview system 10 also provides a method of tailoring how an image will appear in a second graphics environment without altering how the image appears in the first environment. After selecting a display characteristic of a preview image (62) and specifying a replacement characteristic (64), the image preview system can modify the preview image by replacing the selected display characteristic with its designated replacement (66). For example, a developer could click on a region of a preview image that exhibits undesirable dithering and color the pixels in that region with the nearest web-safe color. Thereafter, the image preview system can display the preview image using the replacement characteristic. optionally, the system can also alter the original image as in appears in the first graphics environment.

Figure 7:
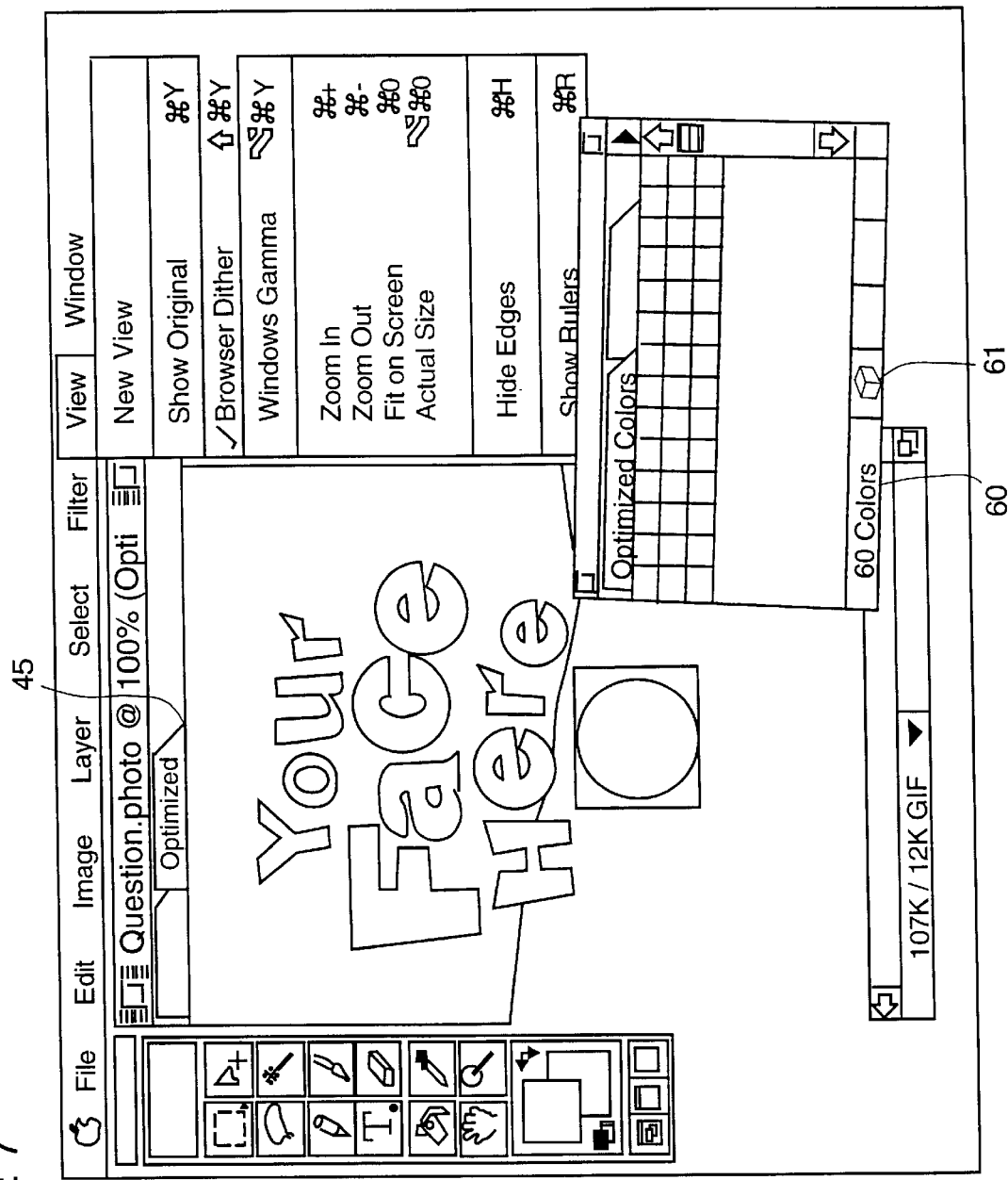
FIG. 7 is a diagram of a graphical user interface providing preview image tailoring.

Referring to FIG. 7, the interface 41 may provide a window 60 that displays the current palette used by a preview image 43'. After viewing a preview image 43' and identifying undesired dither patterns, a developer can instruct the image preview system to replace a particular color which exhibits dithering in the second environment with the closest web-safe color. The developer can do this by clicking on a point within the preview image 43' or a point in the original image that corresponds to a dithered color and clicking on a web-shift button 61 on the palette window 60. Selective use of web-safe colors leaves the image developer with discretion as to whether particular dithering is so undesirable that it should be replaced with a web-safe color. Alternatively, the image preview system 10 could use a variety of criteria to automatically identify potentially undesirable dithering and automatically convert such colors to the nearest web-safe palette color.

Figure 8:
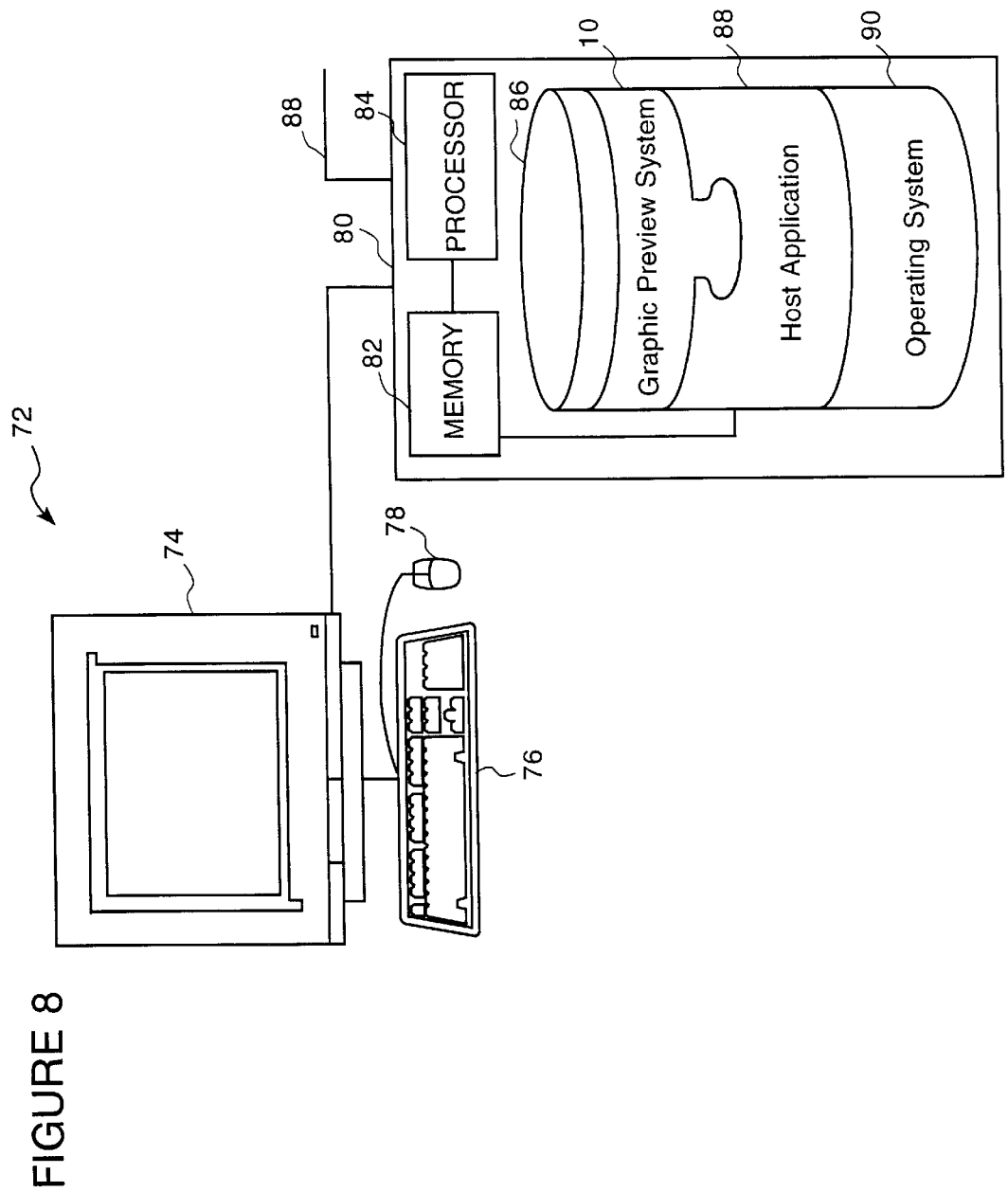
FIG. 8 is a diagram of computer platform suitable for executing the image preview system.

Referring to FIG. 8, a computer platform 72 includes a display 74, a keyboard 76, and a digital computer 80. The digital computer 80 includes memory 82, a processor 84, a mass storage device 86, and other customary components such as a memory bus and peripheral bus (not shown). The platform 72 may further include a network connection 88.

Mass storage device 86 stores the image preview system 10. Image preview system 10 instructions may be transferred to memory 82 in the course of operation. The image preview system 10 causes the display 74 to display images and preview images. The image preview system 10 may be integrated into a host application 88 as a plug-in.

The invention may be implemented in computer hardware, firmware, software, or a combination of the three. Preferably, however, implementation of apparatus of the invention includes a computer program product tangibly embodied in a computer' program storage device for execution by a computer processor; and implementation of methods of the invention includes execution of method steps by a computer processor under control of a stored program executed by the processor from a randomly accessible program store to perform the functions of the invention by operating on input data and generating output. Suitable processors include, by way of example, both general and special purpose microprocessors. Generally, a processor will receive instructions and data from a read-only memory and/or a random access memory. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks; magneto-optical disks; and CD-ROM disks.

What is claimed is:

1. A method of preparing an image for display, comprising:

displaying an original image on a display device in a first video graphics environment using a first color palette, the source image being defined by a raster of source image pixels each having a respective source color value selected from a source set of colors, the first color palette providing a color data representation for a first set of colors, the first set of colors being smaller than the source set of colors;

receiving a selection identifying a second video graphics environment having a different, second color palette, where the second color palette provides a color data representation for a second set of colors, and where the first set of colors includes colors not present in the second set of colors;

generating a preview image using only the colors of the second color palette, wherein colors not present in the second set of colors are simulated in the preview image by dithering colors that are present in the second set of colors, and wherein colors present in both the first and second sets of colors are displayed in the preview image with a single color from the second color palette;

simultaneously displaying the original image and the preview image in the first video graphics environment, whereby the preview image simulates how the unaltered original image will appear in the second video graphics environment;

receiving a user selection input that selects a color not present in the second palette;

automatically determining a replacement color for the selected color from among colors present in the second palette; and in the preview image, replacing the selected color with the replacement color.

2. The method of claim 1, wherein the second color palette is an 8-bit color palette.

3. The method of claim 1, wherein the in the source set of colors are each represented by 24 bits.

4. The method of claim 1, wherein the first color palette is an adaptive palette.

5. The method of claim 1, wherein the replacement color is a web-safe palette color.

6. The method of claim 5, wherein the user selection input includes an action selecting a location in the preview image.

7. The method of claim 6, wherein determining a replacement color comprises determining a closest web-safe palette color.

8. The method of claim 1, further comprising replacing the selected color with the replacement color in the original image, whereby the original image is modified.

9. A computer program product recorded on a computer-readable medium and comprising instructions operable to cause a programmable processor to:

display an original image on a display device in a first video graphics environment using a first color palette, the source image being defined by a raster of source image pixels each having a respective source color value selected from a source set of colors, the first color palette providing a color data representation for a first set of colors, the first set of colors being smaller than the source set of colors;

receive a selection identifying a second video graphics environment having a different, second color palette, where the second color palette provides a color data representation for a second set of colors, and where the first set of colors includes colors not present in the second set of colors;

generate a preview image using only the colors of the second color palette, wherein colors not present in the second set of colors are simulated in the preview image by dithering colors that are present in the second set of colors, and wherein colors present in both the first and second sets of colors are displayed in the preview image with a single color from the second color palette;

display simultaneously the original image and the preview image in the first video graphics environment, whereby the preview image simulates how the unaltered original image will appear in the second video graphics environment;

receive a user selection input that selects a color not present in the second palette;

determine automatically a replacement color for the selected color from among colors present in the second palette; and replace the selected color in the preview image with the replacement color.

10. The computer program product of claim 9, wherein the second color palette is an 8-bit color palette.

11. The computer program product of claim 9, wherein the colors in the source set of colors are each represented by 24 bits.

12. The computer program product of claim 9, wherein the first color palette is an adaptive palette.

13. The computer program product of claim 9, wherein the replacement color is a web-safe palette color.

14. The computer program product of claim 13, wherein the user selection input includes an action selecting a location in the preview image.

15. The computer program product of claim 14, wherein determining a replacement color comprises determining a closest web-safe palette color.

16. The computer program product of claim 9, further comprising replacing the selected color with the replacement color in the original image, whereby the original image is modified.

* * * * *

UNITED STATES PATENT AND TRADEMARK OFFICE
CERTIFICATE OF CORRECTION

PATENT NO. : 6,313,824 B1
DATED : November 6, 2001
INVENTOR(S) : Douglas C. Shimonek, Douglsa K. Olson and Douglas E. Meisner It is certified that error appears in the above-identified patent and that said Letters Patent is hereby corrected as shown below:

Column 6,
Line 10, after "wherein the" please insert -- colors --.

Signed and Sealed this

Fourth Day of June, 2002

Attest:

Attesting Officer

JAMES E. ROGAN
Director of the United States Patent and Trademark Office